(12) United States Patent
Cordy

(10) Patent No.: US 8,714,901 B2
(45) Date of Patent: May 6, 2014

(54) GARBAGE CAN LIFTER

(76) Inventor: David Cordy, Lagrange, OH (US)

( * ) Notice: Subject to any disclaimer, the term of this patent is extended or adjusted under 35 U.S.C. 154(b) by 533 days.

(21) Appl. No.: 13/070,940

(22) Filed: Mar. 24, 2011

(65) Prior Publication Data

US 2012/0243968 A1    Sep. 27, 2012

(51) Int. Cl.
*B65F 3/04* (2006.01)
*B65F 3/00* (2006.01)
*A01B 59/06* (2006.01)

(52) U.S. Cl.
CPC . *B65F 3/041* (2013.01); *B65F 3/00* (2013.01); *A01B 59/06* (2013.01); *Y10S 414/125* (2013.01); *Y10S 414/133* (2013.01)
USPC ........... 414/408; 414/462; 414/607; 414/680; 414/912; 414/920

(58) Field of Classification Search
USPC ......... 414/408, 420, 490, 607, 680, 912, 920, 414/280, 462, 465
See application file for complete search history.

(56) References Cited

U.S. PATENT DOCUMENTS

| | | | |
|---|---|---|---|
| 3,208,614 A | 9/1965 | Armitage | |
| 3,224,595 A | 12/1965 | Sherley | |
| 3,747,785 A | 7/1973 | Dahlin | |
| 4,614,350 A | 9/1986 | Bunch | |
| 4,687,405 A | 8/1987 | Olney | |
| 5,002,450 A | 3/1991 | Naab | |
| 5,257,877 A | 11/1993 | Zelinka | |
| 5,333,984 A | 8/1994 | Bayne | |
| 5,690,182 A * | 11/1997 | Ward | 172/439 |
| 5,826,485 A | 10/1998 | Bayne | |
| 6,059,512 A | 5/2000 | Kielinski | |
| 6,361,264 B1 * | 3/2002 | Guthrie et al. | 414/462 |
| 6,379,099 B1 | 4/2002 | Novak | |
| 6,474,930 B1 | 11/2002 | Simpson | |
| 6,698,995 B1 * | 3/2004 | Bik et al. | 414/462 |
| 7,101,142 B2 * | 9/2006 | Bik et al. | 414/462 |
| 7,217,078 B2 * | 5/2007 | Short | 414/462 |
| 2008/0101899 A1 * | 5/2008 | Slonecker | 414/462 |
| 2009/0101685 A1 * | 4/2009 | Robb | 224/495 |
| 2010/0272548 A1 * | 10/2010 | McKamey | 414/462 |

* cited by examiner

*Primary Examiner* — Scott Lowe
*Assistant Examiner* — Ronald Jarrett
(74) *Attorney, Agent, or Firm* — John D. Gugliotta

(57) ABSTRACT

A garbage can lifter having a pair of arms operatively connected to a handle, and a pair of pins secured to exterior surfaces of the pair of arms. The pair of arms is adapted to be operatively connected to one or more lifting arms of a tractor. The garbage can lifter also has a cross member secured to the pair of arms and the handle. The handle is positioned between the pair of arms and between interior surfaces of the pair of arms.

12 Claims, 6 Drawing Sheets

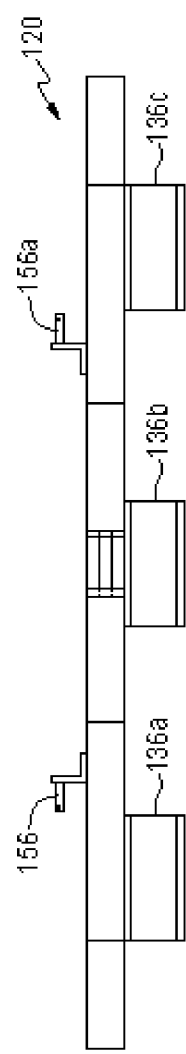
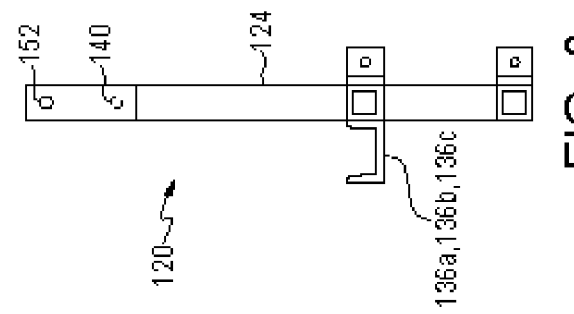
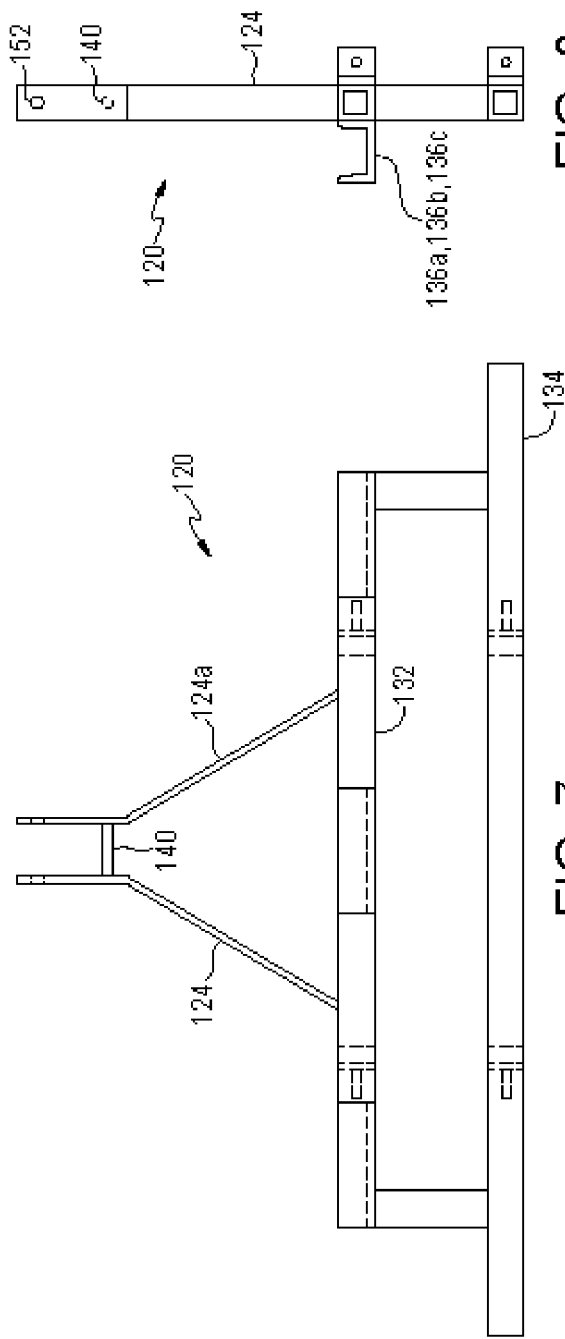

GARBAGE CAN LIFTER

BACKGROUND OF THE INVENTION

A garbage can lifter can be advantageous in handling garbage cans. Large automated commercial trucks can handle large numbers of garbage cans quickly. Of course, individual home owners do not own such trucks, yet still have to manage garbage cans regularly, sometimes over long distances. The garbage cans can be heavy and difficult to manage. There remains a long-felt need for a suitable garbage can lifter.

BRIEF DESCRIPTION OF THE DRAWINGS

FIG. 3 is a perspective elevational view of the garbage can lifter of FIG. 2 lifting one garbage can.

FIG. 6 is a top view of the garbage can lifter of FIGS. 2, 3, and 4.

FIG. 7 is a front elevational view of the garbage can lifter of FIGS. 2, 3, and 4.

FIG. 8 is an elevational view of the garbage can lifter of FIG. 2.

SUMMARY OF INVENTION

Figure 1:
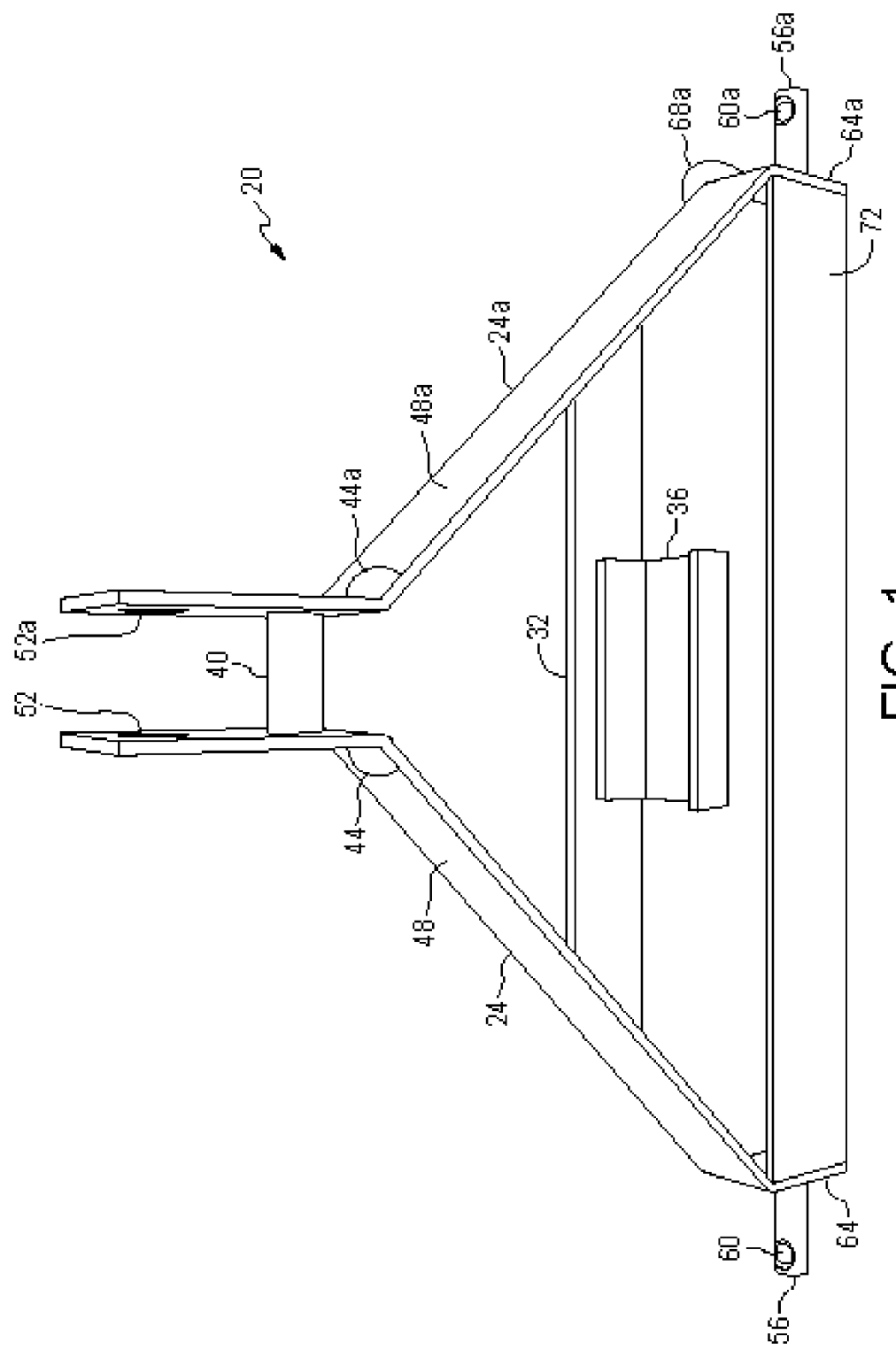
FIG. 1 is a cross sectional view in elevation of a garbage can lifter having one handle in accordance with an embodiment of the present invention.
Figure 2:
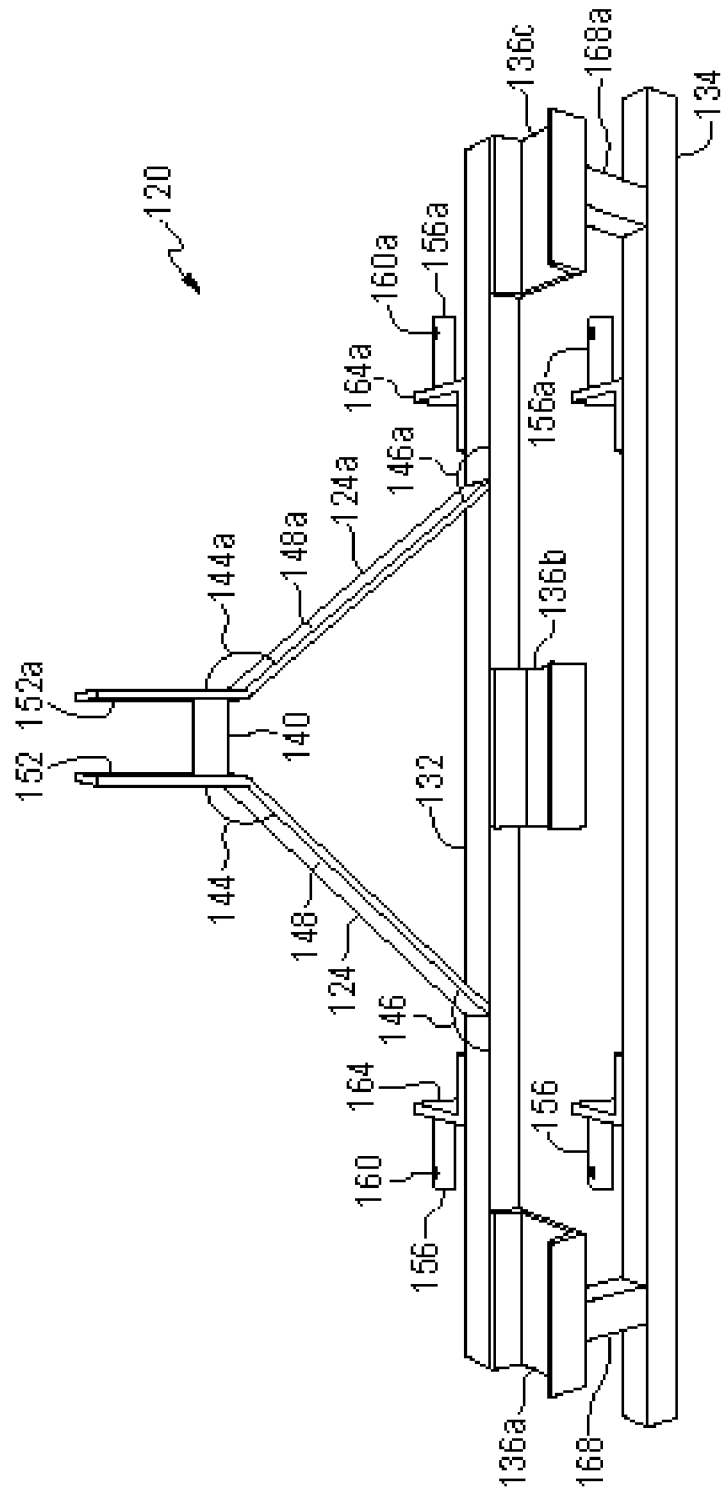
FIG. 2 is a perspective elevational view of a garbage can lifter having three handles.

There is provided a garbage can lifter having a pair of arms operatively connected to a handle, and a pair of pins secured to exterior surfaces of the pair of arms. The pair of arms is adapted to be operatively connected to one or more lifting arms of a tractor. The garbage can lifter also has a cross member secured to the pair of arms and the handle. The handle is positioned between the pair of arms and between interior surfaces of the pair of arms.

DETAILED DESCRIPTION OF THE INVENTION

Preliminarily, it should be noted that certain terms used herein, such as for example above, below, upper, lower, left and right, are used to facilitate the description of the invention. Unless otherwise specified or made apparent by the context of the discussion, such terms and other directional terms should be interpreted with reference to the figure(s) under discussion. Such terms are not intended as a limitation on the position in which the invention or components may be used. Indeed, it is contemplated that the components of the invention may be easily positioned in any desired orientation for use. Likewise, numerical terms such as for example "first", and "second" are not intended as a limitation or to imply a sequence, unless otherwise specified or made apparent by the context of the discussion. The term "operatively connected" is understood to include a linking together of the portions under consideration and may include a physical engagement and/or a functional or operational connection.

Referring now to the drawings, there is illustrated in FIGS. 1 through 8 a garbage can lifter, indicated generally at 20 and 120, according to the invention. The garbage can lifter 20 shown includes two arms 24, 24a, a first arm 24 and a second arm 24a secured to a cross member 32. The cross member 32 is shown generally planar. The cross member 32 may be secured to a handle 36. The illustrated handle 36 is generally planar on three sides and open on three sides. A separator 40 is provided between the arms 24, 24a. The illustrated separator 40 is generally cylindrical. The separator 40 may be provided on the interior surface of the arms 24, 24a as shown.

The illustrated arm 24a includes a corner at an angle 44a. The illustrated arm 24 includes a corner at an angle 44. The angle at corner 44a is an obtuse angle when measured on an exterior surface 48a of the arm 24a. The separator 40 is provided between the corner 44a and an opening 52a in the arm 24a. The illustrated opening 52 is generally rounded, but may be any suitable shape as desired. The separator 40 between the corner 44a of the arm 24a and the opening 52a in the arm 24a allow portions of the two arms 24, 24a to be positioned generally parallel to each other. The generally parallel portions of the two arms 24, 24a include the openings 52, 52a therein.

The term "angle" as used in this application may be understood to include, but is not limited to, any structure or functionality which defines or creates a corner. The corner may constitute a projecting part or an enclosed or partially enclosed space. The corner may be generally straight, generally curved or arced—or partially straight or curved. The term "angle" may also include the space between two lines or surfaces at or near the point at which they touch or intersect.

The illustrated garbage can lifter 20 includes a pair of pins 56, 56a having a generally rounded opening 60, 60a therein. The illustrated pins 56, 56a are generally cylindrical. The pins 56, 56a are shown secured to a flat bent portion 64, 64a of the two arms 24, 24a. The bent portion 64, 64a defines a corner oriented an angle 68a which is an obtuse angle when measured on the exterior surface 48a. A plate 72 may be provided across the first arm 24 and the second arm 24a as shown.

Referring now primarily to FIG. 2 through FIG. 8, a garbage can lifter 120 may also be configured to employ any suitable multiple of handles, or a plurality such as three handles 136a, 136b, 136c. The garbage can lifter 120 shown includes two arms 124, 124a, a first arm 124 and a second arm 124a secured to a first cross member 132. The cross member 132 is shown as a four-sided squared tube. The first arm 124 and the second arm 124a are shown generally centered on the first cross member 132.

The first cross member 132 may be secured with the handles 136a, 136b, 136c. The handle 136b is shown generally centered on the first cross member 132. The illustrated handles 136a, 136b, 136c are generally planar on three sides and open on three sides. A separator 140 is provided between the arms 124, 124a. The illustrated separator 140 is generally cylindrical. The separator 140 may be provided on the interior surface of the arms 124, 124a as shown.

The illustrated garbage can lifter 20 includes a pair of pins 156, 156a having a generally rounded opening 160, 160a therein. The illustrated pins 156, 156a are generally cylindrical and may be shown operatively connected to a pair of brackets 164, 164a on the first cross member 132. The pins 156, 156a may also be operatively connected to a second cross member 134. The second cross member 134 is shown as a four-sided squared tube. The first cross member 132 and second cross member 134 are shown operatively connected by a pair of four-sided squared tubes 168. It will be noted that a pair of handles 136a, 136c is positioned generally outwardly of the pair of pins 156, 156a.

The garbage can lifter 120 may be adapted to be operatively connected to a tractor 172 as desired. The tractor 172 may include a plurality of lift arms 176a, 176b, 176c, adapted to couple with a wide variety of accessories, including but not limited to the garbage can lifter 20, 120. The term "accessory" may include (but is not limited to) a part or component that may be fitted to and/or with something to perform an additional function or enhance performance and/or appearance.

In operation, the garbage can lifter 20, 120 may be employed as a coupling with a tractor and one or more garbage cans. The term "coupling" may include (but is not limited to) one or more structures or components that join two things, including a device for connecting two things and/or objects. The garbage can lifter 20, 120 is not limited in functionality to employment with garbage cans, but can be used with other types of cans, containers, barrels, or the like.

Figure 3:
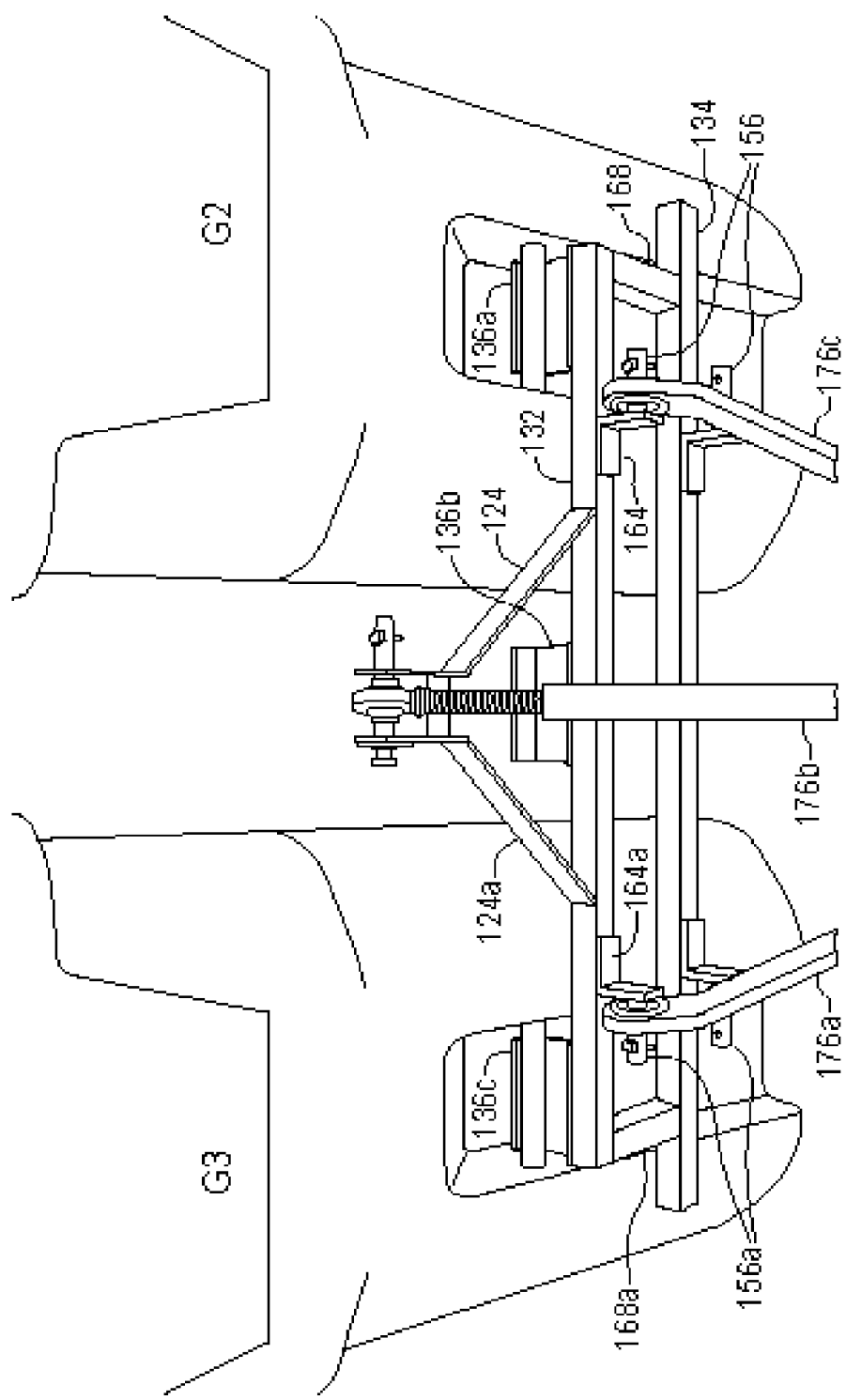
FIG. 3 is a perspective elevational view of the garbage can lifter of FIG. 2 lifting two garbage cans.

It will be noted that in FIG. 3, the garbage can lifter 120 is employed to engage two garbage cans G2, G3. Specifically, the garbage can G3 shown on the left is illustrated as operatively connected to the garbage can lifter 120 via the handle 136c. The garbage can G2 shown on the right is illustrated as operatively connected to the garbage can lifter 120 via the handle 136a. As the lift arms 176a, 176b, 176c are coupled with the pins 156, 156a and the first arm 124 and the second arm 124a, the two garbage cans G2, G3 may be raised or lowered as desired when the lift arms 176a, 176b, 176c are raised or lowered by the tractor 172.

Figure 4:
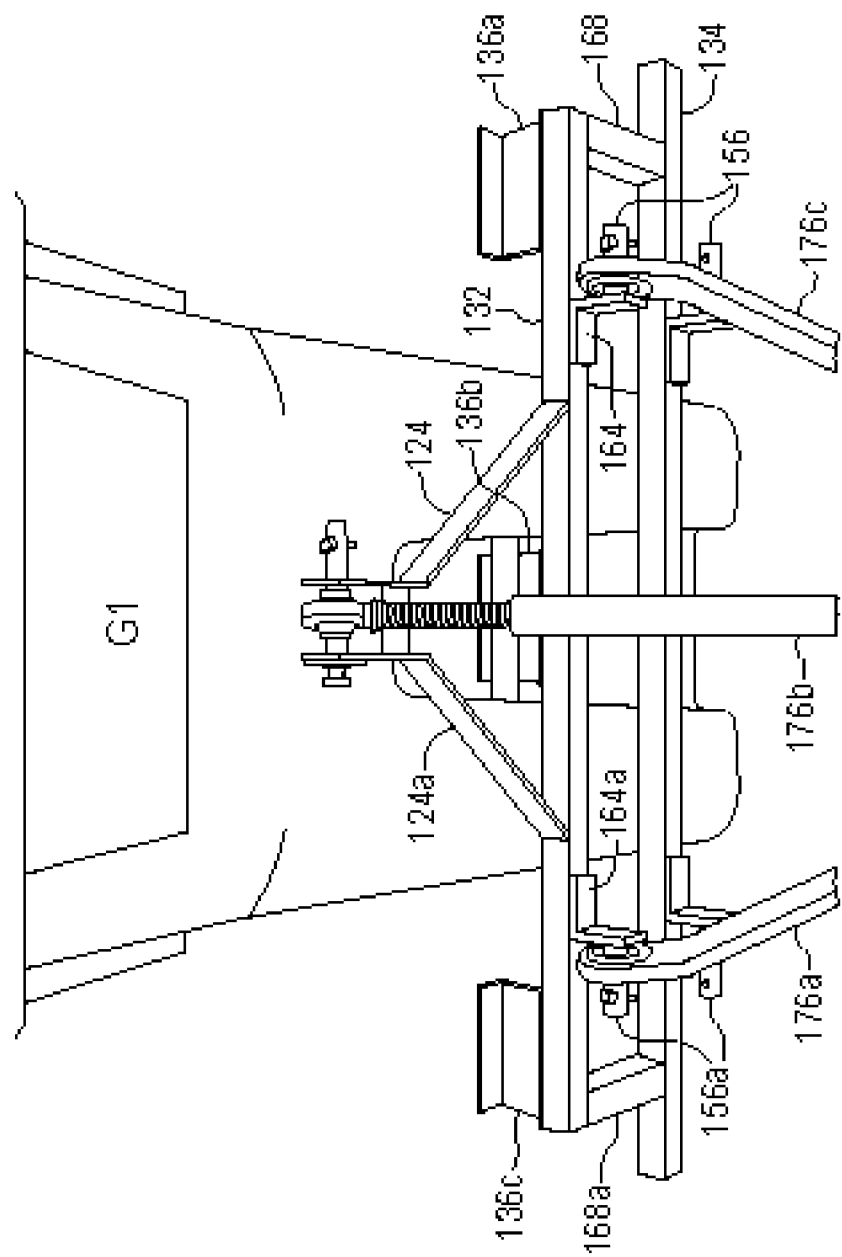
Figure 5:
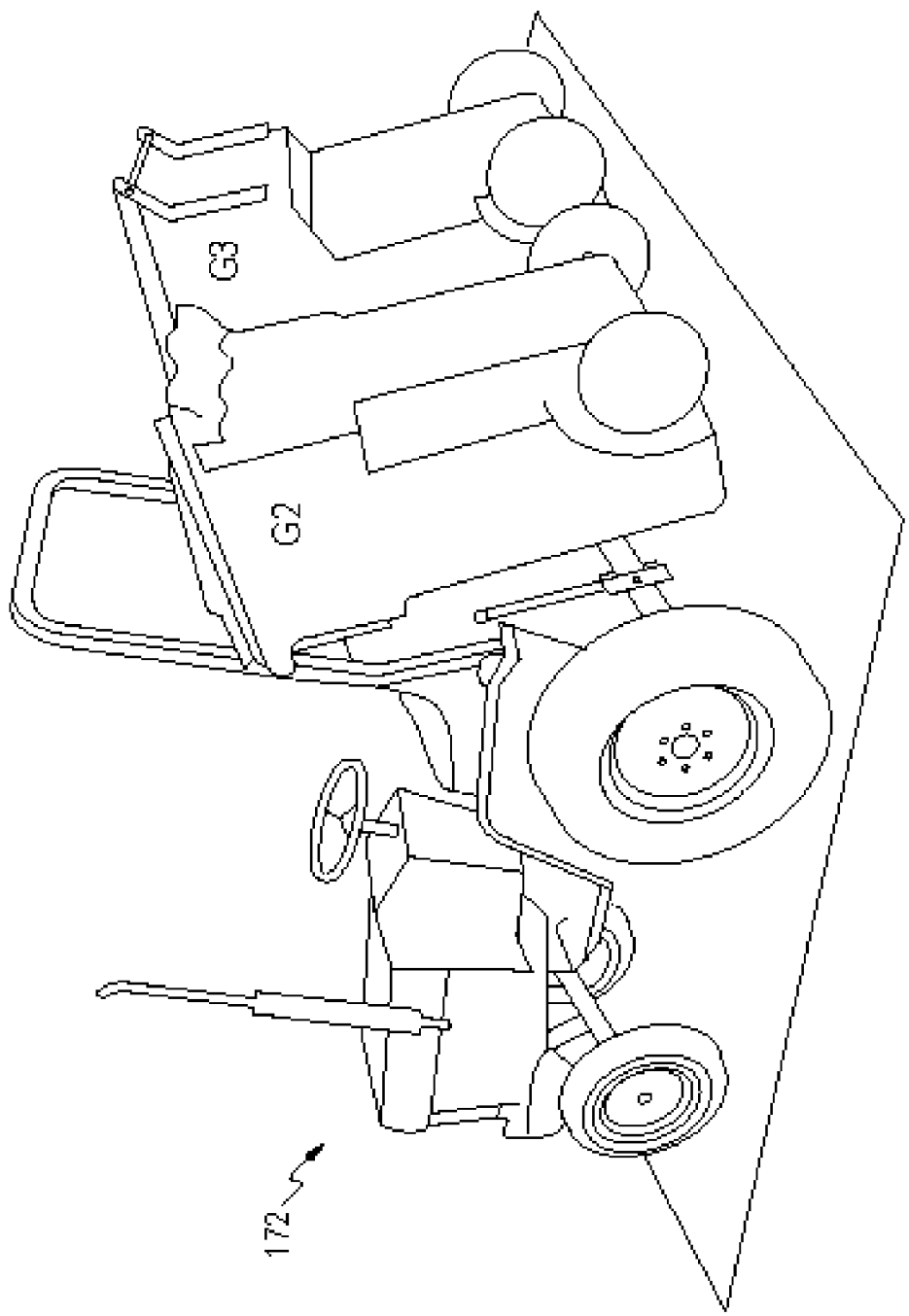
FIG. 5 is an perspective elevational view of a tractor and the garbage can lifter of FIG. 2 lifting two garbage cans.

It will be noted that in FIG. 4, the garbage can lifter 120 is employed to engage one garbage can G1. Specifically, the garbage can G1 illustrated as operatively connected to the garbage can lifter 120 via the handle 136b. As the lift arms 176a, 176b, 176c are coupled with the pins 156, 156a and the first arm 124 and the second arm 124a, the garbage can G1 may be raised or lowered as desired when the lift arms 176a, 176b, 176c are raised or lowered by the tractor 172.

In operation, the garbage can lifter 20, 120 may be employed to engage the appropriate number of garbage cans corresponding to handles 36, 136a, 136b, 136c, on the garbage can lifter 20, 120. In one manner of usage, the garbage can lifter 20, 120 may be generally secured to the arms 176a, 176c, 176b of the tractor 172 when the arms 176a, 176c, 176b are in a generally somewhat down or lowered position. The arms 176a, 176c, 176b may be secured to the pins 56,56a or pins 156,156a as desired. The pins 156,156a may be located on the first cross member 132 or the second cross member 134 as desired.

The tractor 172 may then be moved generally toward the garbage can(s) G1, G2, G3 to be lifted—or the garbage can(s) G1, G2, G3 moved toward the tractor. When the handles 36, 136a, 136b, 136c, on the garbage can lifter 20, 120 are generally positioned within the recess of the garbage can(s) G1, G2, G3 as indicated in FIG. 3 and FIG. 4, the arms 176a, 176c, 176b of the tractor 172 may then be moved into a generally raised position. Raising the arms 176a, 176c, 176b of the tractor 172 as such will raise the garbage can(s) G1, G2, G3 as desired.

The invention may be made from any suitable material and by any suitable method. The invention may be adapted to fit a wide variety of uses. It will be appreciated that the components of the invention may be easily modified as needed to accommodate varying sizes and shapes. The definitions provided herein are solely to facilitate an understanding of the invention—not to limit the invention.

It is to be understood that the invention is not limited in its application to the details of construction and to the arrangements of the components set forth in the accompanying description or illustrated in the drawings. The invention is capable of other embodiments and of being practiced and carried out in various ways. Also, it is to be understood that the phraseology and terminology employed herein are for the purpose of description and should not be regarded as limiting.

The disclosure may readily be utilized as a basis for the designing of other structures, methods and systems for carrying out the present invention. It is important, therefore, that the claims be regarded as including equivalent constructions. Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract and disclosure are neither intended to define the invention of the application, which is measured by the claims, nor are they intended to be limiting as to the scope of the invention in any way.

What is claimed is:

1. A garbage can attachment implement for lifting and supporting a garbage can to a tractor standard three-point hitch connection having a pair of lower lifting arms and an upper pivoting attachment, said implement comprising:
    a pair of arms operatively connected to an upper pivoting attachment of the tractor three-point hitch connection;
    a pair of pins secured to exterior surfaces of the pair of arms, the pair of arms being adapted to be operatively connected to one or more lower lifting arms of the tractor three-point hitch connection;
    a pair of cross member secured to a pair of arms and the handle, the handle being positioned on one said cross member between the pair of arms and between interior surfaces of the pair of arms; and
    at least one hook-shaped, upwardly open grasping handle secured to said cross member and adapted for securing to a structure of a garbage can.

2. The garbage can lifter of claim 1 further comprising a generally cylindrical separator between the pair of arms wherein the separator is positioned on the interior surfaces of the pair of arms.

3. The garbage can lifter of claim 2 wherein each of the arms includes two angles on the exterior surfaces of more than ninety degrees each.

4. The garbage can lifter of claim 1 wherein each of the pair of arms includes an opening therein.

5. The garbage can lifter of claim 1 wherein the hook-shaped, upwardly open grasping handle further comprises three generally planar sides.

6. The garbage can lifter of claim 1 wherein the cross member is generally planar.

7. A garbage can attachment implement for lifting and supporting a garbage can to a tractor standard three-point hitch connection having a pair of lower lifting arms and an upper pivoting attachment, said implement comprising:
    a pair of arms operatively connected to an upper pivoting attachment of the tractor three-point hitch connection;
    a pair of pins secured to exterior surfaces of the pair of arms, the pair of arms being adapted to be operatively connected to one or more lower lifting arms of the tractor three-point hitch connection;
    a first cross member indirectly connected to a second cross member, the first cross member and second cross member being positioned generally parallel to each other; and
    a plurality of hook-shaped, upwardly open grasping handles secured to said first cross member and adapted for securing to a structure of a garbage can.

8. The garbage can lifter of claim 7 further comprising a generally cylindrical separator between the pair of arms wherein the first cross member and the second cross member are four-sided squared tubes.

9. The garbage can lifter of claim 7 further comprising a generally cylindrical separator between the pair of arms wherein the pair of pins is operatively connected to the first cross member.

10. The garbage can lifter of claim 7 further comprising a generally cylindrical separator between the pair of arms wherein the pair of pins is operatively connected to the second cross member.

11. The garbage can lifter of claim 7 wherein each of the arms includes two angles on the exterior surfaces of more than ninety degrees each.

12. The garbage can lifter of claim 7 wherein each of the pair of arms includes an opening therein.

\* \* \* \* \*